United States Patent [19]
Antcliff et al.

[11] Patent Number: 5,965,806
[45] Date of Patent: Oct. 12, 1999

[54] ENGINE CRANKSHAFT SENSING SYSTEM

[75] Inventors: Steve Antcliff; Al Schuppe, both of Columbus; Brian J. McKinley, Hope, all of Ind.

[73] Assignee: Cummins Engine Company, Inc., Columbus, Ind.

[21] Appl. No.: 08/975,416

[22] Filed: Nov. 6, 1997

Related U.S. Application Data

[63] Continuation of application No. 08/722,295, Sep. 30, 1997, abandoned.

[51] Int. Cl.⁶ .................................................. G01M 15/00
[52] U.S. Cl. .................................................. 73/116
[58] Field of Search .................... 73/116, 117.2, 73/117.3, 118.1; 701/110, 111

[56] References Cited

U.S. PATENT DOCUMENTS

| | | | |
|---|---|---|---|
| 4,002,937 | 1/1977 | Anson | 310/168 |
| 4,155,340 | 5/1979 | Fernquist et al. | 123/148 |
| 4,235,101 | 11/1980 | Stadelmann | 73/116 |
| 4,356,447 | 10/1982 | Honig et al. | 324/169 |
| 4,365,602 | 12/1982 | Stiller et al. | 123/414 |
| 4,442,822 | 4/1984 | Kondo et al. | 123/643 |
| 4,558,591 | 12/1985 | Francis et al. | 73/116 |
| 4,760,827 | 8/1988 | Schreiber et al. | 123/414 |
| 4,779,454 | 10/1988 | Fitzner et al. | 73/116 |
| 4,833,405 | 5/1989 | Richards et al. | 324/208 |
| 4,932,388 | 6/1990 | Chiba et al. | 123/613 |
| 4,936,277 | 6/1990 | Deutsch et al. | 123/436 |
| 4,942,761 | 7/1990 | Batzill | 73/119 |
| 4,989,574 | 2/1991 | Abe | 123/617 |
| 5,070,727 | 12/1991 | Davis et al. | 73/116 |
| 5,109,695 | 5/1992 | James et al. | 73/117.3 |
| 5,119,670 | 6/1992 | Whitehorn et al. | 73/116 |
| 5,165,271 | 11/1992 | Stepper et al. | 73/116 |
| 5,227,719 | 7/1993 | Peterson et al. | 324/174 |
| 5,243,279 | 9/1993 | Bajat et al. | 324/207.21 |
| 5,293,776 | 3/1994 | Takegami et al. | 73/119 |
| 5,347,857 | 9/1994 | Mirhakimi et al. | 73/118.1 |
| 5,361,630 | 11/1994 | Kowalski | 73/117.3 |
| 5,444,369 | 8/1995 | Leutzow | 324/207.2 |
| 5,460,134 | 10/1995 | Ott et al. | 123/476 |
| 5,469,055 | 11/1995 | Mueller et al. | 324/207.21 |
| 5,469,823 | 11/1995 | Ott et al. | 123/414 |
| 5,476,082 | 12/1995 | Carpenter et al. | 123/478 |
| 5,520,043 | 5/1996 | Koelle et al. | 73/117.3 |

FOREIGN PATENT DOCUMENTS

| | | |
|---|---|---|
| 0 665 375 A2 | 8/1995 | European Pat. Off. . |
| 0 665 375 A3 | 4/1996 | European Pat. Off. . |
| 2604599 A1 | 8/1977 | Germany . |
| 4309245 A1 | 9/1994 | Germany . |

*Primary Examiner*—George Dombroske
*Attorney, Agent, or Firm*—Woodard, Emhardt, Naughton, Moriarty & McNett

[57] ABSTRACT

An internal combustion engine system is disclosed which includes an engine crankshaft with a plurality of crankshaft webs. A reference ring is mounted to one of the crankshaft webs to rotate therewith. The ring encircles the crankshaft and has a number of angularly spaced indicators. A sensor is located proximate to the ring and detects the indicators to provide a sensor signal corresponding to a rotational characteristic of the crankshaft. The ring may be comprised of more than one piece to facilitate installation and removal without disassembly of the crankshaft. The indicators may be provided by defining a number of peripheral teeth for detection by the sensor.

26 Claims, 3 Drawing Sheets

ENGINE CRANKSHAFT SENSING SYSTEM

This application is a continuation of application Ser. No. 08/722,295, filed Sep. 30, 1997, now abandoned.

BACKGROUND OF THE INVENTION

The present invention relates to systems to detect rotational characteristics of a mechanical member, and more particularly, but not exclusively, relates to a sensor arrangement to detect a rotational characteristic of an engine crankshaft.

With the advent of electronically controlled internal combustion engines, devices to detect rotation of the engine crankshaft have become increasingly popular. For example, angular position of the crankshaft or "crank angle" is frequently sensed to control engine fueling, ignition, and exhaustion. Also, engine speed, as indicated by rotational speed of the crankshaft, is often an important parameter in various engine control system schemes. U.S. Pat. No. 5,476,082 to Carpenter et al., U.S. Pat. No. 5,361,630 to Kowalski, and U.S. Pat. No. 4,936,277 to Deutsch et al. are cited as general sources of background information relating to various electronic engine control systems which rely on measurement of crankshaft rotation.

In order to meet increasingly rigorous emission standards imposed on vehicles with internal combustion engines, crank angle needs to be measured with high precision. One way to provide the needed precision is to employ a crank angle detection system that has a sensor and a reference member which rotates with the crankshaft adjacent the sensor. The sensor is configured to detect rotation of the reference member.

One type of detection system has a reference member with several angularly spaced indicators, or "angle marks," along its periphery which are configured to alter a magnetic field. As each one of these indicators moves past the sensor, the sensor detects the corresponding alteration of the magnetic field and generates a detection pulse. By varying the spacing of the indicators in a known manner, an index to the relative angular position of the crankshaft may be provided. Also, the rate of these pulses may be used to determine rotational speed of the crankshaft. U.S. Pat. No. 5,520,043 to Koelle et al., U.S. Pat. No. 5,469,823 to Ott et al., U.S. Pat. No. 5,460,134 to Ott et al., U.S. Pat. No. 4,760,827 to Schreiber et al., U.S. Pat. No. 4,442,822 to Kondo et al., and U.S. Pat. No. 4,365,602 to Stiller et al. are cited as examples of various types of crank angle detection systems.

In one crank angle detection system arrangement, a reference disc is attached to a transmission fly wheel external to the engine. Unfortunately, external placement of the disc usually requires a separate design effort for each different type of transmission offered with a given engine design. Therefore, in many instances it is desirable to provide the reference disc as part of the engine. However, attaching the disc directly to the crankshaft generally requires lengthening the crankshaft to provide an appropriate attachment site.

U.S. Pat. No. 5,361,630 to Kowalski discloses one attempt to solve this problem by integrally forming indicator slots on a crankshaft counter weight which then serves as a rotational reference member. Unfortunately, this approach still requires an extensive re-design of the crankshaft. Also, the integral counter weight design requires disassembly of the crankshaft should replacement or adjustment of the reference member be required.

Thus, there remains a need for a crankshaft rotation detection system that can be readily adapted to different engine configurations. The present invention satisfies this need.

SUMMARY OF THE INVENTION

The present invention relates to a system for detecting a rotational characteristic of an engine crankshaft. Various aspects of the invention are novel, non-obvious, and provide various advantages. Although the actual nature of the invention covered herein can only be determined with reference to the claims appended hereto, certain features which are characteristic of the invention as disclosed herein can be described briefly.

One feature of the present invention is an internal combustion engine system that includes an engine crankshaft with a plurality of crankshaft webs. This crankshaft is configured to rotate during engine operation. A reference ring is mounted to one of the crankshaft webs to rotate therewith. The ring circumscribes a portion of the crankshaft and has a number of angularly spaced indicators. The system also includes a sensor located proximate to the ring and configured to detect the indicators and provide a sensor signal corresponding to a rotational characteristic of the crankshaft. Mounting the ring to the crankshaft web provides a reference structure which does not require extensive crankshaft redesign.

Another feature of the present invention is a system having an engine crankshaft with a plurality of crankshaft webs and a rotational reference device including at least two separable pieces mounted to one of the crankshaft webs. A sensor is positioned proximate to the crankshaft and is responsive to movement of the reference device to provide a sensor signal corresponding to a rotational characteristic of the crankshaft. This system provides a reference structure which also avoids extensive crankshaft redesign.

In an additional feature of the present invention, a tone wheel is provided that is configured for attachment to a crankshaft web of an internal combustion crankshaft to detect a rotational parameter of the crankshaft with a sensor responsive to variation of a magnetic field. The tone wheel includes a first ring segment curved to span a first angle of at least 180° which also defines a first number of peripheral teeth each having a generally uniform size and being separated from each other by a generally uniform separation angle. The tone wheel also includes a second ring segment curved to span a second angle of no more than 180° which defines a second number of peripheral teeth each having the generally uniform size and separation angle of the first number of teeth. The first and second segments each define at least one mounting hole configured to receive a fastener for attachment to the crankshaft web. Also, the first and second segments are configured to align with each other on a circular path that encircles a portion of the engine crankshaft when the first and second segments are attached to the crankshaft web to rotate therewith. In addition, one of the first and second segments defines an index gap corresponding to an index angle greater than the generally uniform separation angle. The teeth of the segements are made from a material configured to cause a magnetic field variation detectable by the sensor when the segments are rotated. The multi-piece ring structure of the tone wheel permits assembly about the rotational axis of the crankshaft without needing to disassemble the crankshaft.

Accordingly, it is one object of the present invention to provide a sensor arrangement to detect a rotational characteristic of an engine-crankshaft.

Another object of the present invention is to provide a high precision crank angle reference member for mounting to a crankshaft web that does not require extensive redesign of the crankshaft.

Still another object of the present invention is to provide a multi-piece tone wheel which may be installed and removed from a crankshaft web without disassembling the crankshaft.

Further objects, features, advantages, and aspects of the present invention shall become apparent from the, detailed drawings and descriptions contained herein.

DESCRIPTION OF THE PREFERRED EMBODIMENT

Figure 1:
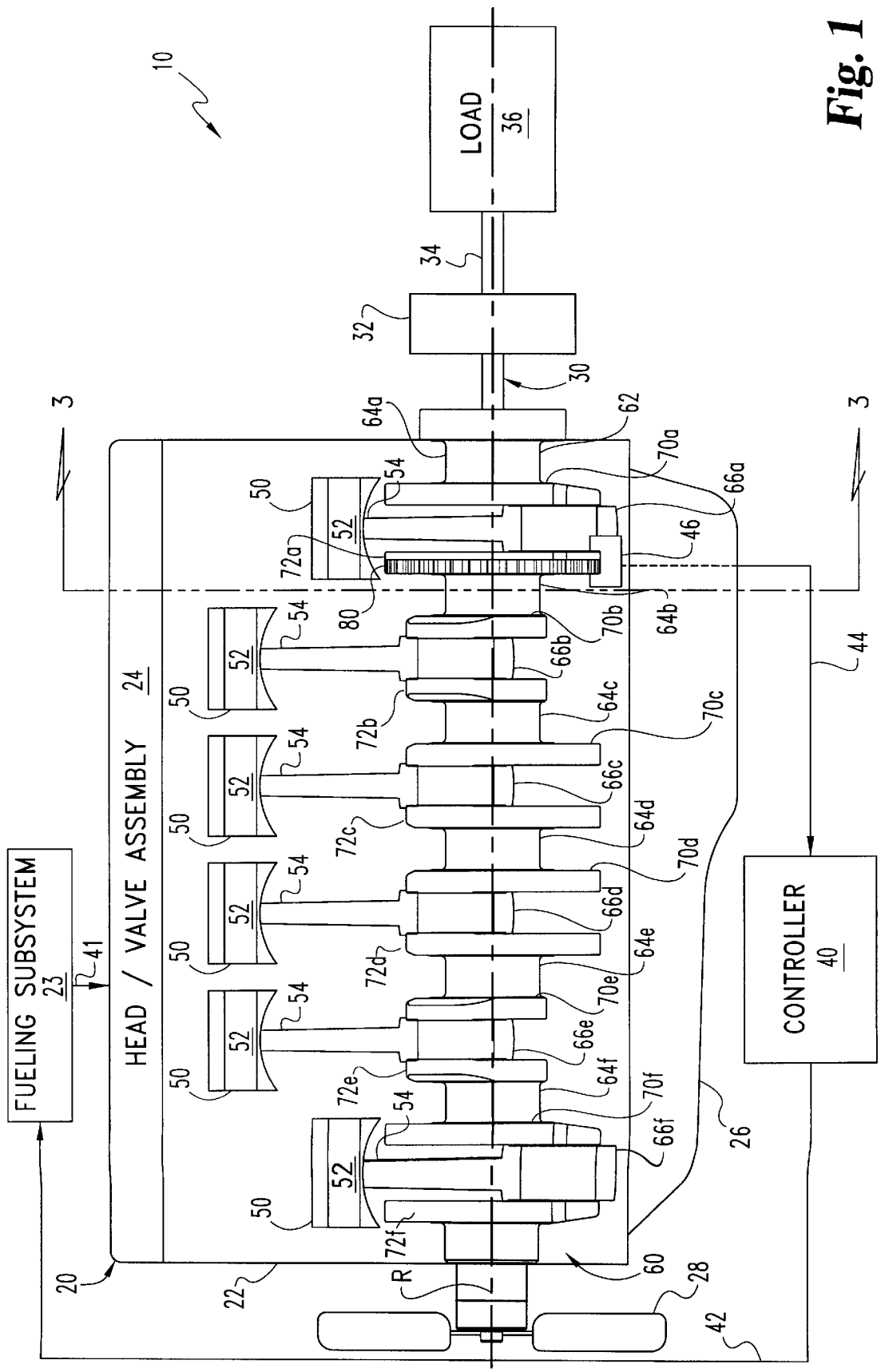
FIG. 1 is a partial diagrammatic view of an internal combustion engine system of one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 depicts internal combustion engine system 10 of the present invention. System 10 includes an engine 20 with block 22, a fueling subsystem 23, and head/valve assembly 24. Engine 20 also includes oil pan 26 and a cooling system represented by radiator fan 28. Preferably, engine 20 has six cylinders and is configured for 4 cycle operation; however, other internal combustion engine configurations known to those,/skilled in the art are also contemplated.

Engine 20 drives power train 30. Power Train 30 includes transmission 32 and drive shaft 34 which drives load 36. For an application that incorporates system 10 into a vehicle, load 36 may represent the powered axle(s) and corresponding ground engaging wheels of the vehicle.

System 10 also includes controller 40 which regulates various operations of engine 20. Controller 40 is operatively coupled to fueling subsystem 23 by line 42. Preferably, fueling subsystem 23 is an electronically controlled fuel pump mechanism which meters fuel supplied to the cylinders of engine 20 in a conventional manner. Line 41 represents the functional coupling of fueling subsystem 23 to engine 20. However, other fueling arrangements are also contemplated, including, but not limited to, an individually actuatable fuel injector for each cylinder. For this alternative embodiment, it is preferred that each injector be directly coupled to controller 40.

Controller 40 also includes an input line 44 from crankshaft sensor assembly 46. Among the operations regulated by controller 40 are engine ignition, fueling, and exhaustion. In part, these activities are controlled by providing appropriate activation signals to fueling subsystem 23. As such, line 42 represents one or more signal paths between controller 40 and fueling subsystem 23. Besides sensor assembly 46, it is envisioned that controller 40 receives input from other sensors including an engine throttle (not shown). The detailed interface and control system processes that may be performed by controller 40 are of the type known to those skilled in the art.

Controller 40 may be an electronic circuit comprised of one or more components. Similarly, controller 40 may be comprised of digital circuitry, analog circuitry, or both. Also, controller 40 may be programmable, an integrated state machine, or hybrid combination thereof. However, preferably controller 40 is a microprocessor based device of known construction.

Engine block 22 defines a number of cylinder bores (not shown) with corresponding combustion chambers each configured to receive a piston assembly 50 in a conventional manner. Each piston assembly. 50 includes a piston 52 and pivotably attached connecting rod 54.

Engine 20 includes crankshaft 60 connected to each piston assembly 50. Crankshaft 60 includes main shaft 62 comprised of crankshaft bearing journals 64a–64f which form a rotational bearing relationship with engine block 22 in a conventional manner. Each connecting rod 54 of piston assemblies 50 is pivotally connected to crankshaft 60 by a corresponding connecting rod journal 66a–66f. Rod journal 66a is pivotally connected to crankshaft 60 at opposing ends by a pair of crankshaft webs 70a, 72a. Crankshaft web 70a pivotally connects to crankshaft bearing journal 64a, and crankshaft web 72a pivotally connects to crankshaft bearing journal 64b. The remaining rod journals 66b–66f and crankshaft webs 70b–70f, 72b–72f are similarly configured along crankshaft 60. Furthermore, crankshaft webs 70a–70f, 72a–72f are preferably configured as crankshaft counter weights. Crankshaft webs 70a–70f, 72a–72f and rod journals 66a–66f are configured to rotate relative to crankshaft bearing journals 64a–64f so that crankshaft 60 turns about rotational axis R in a conventional manner.

A tone wheel 80 is mounted to crankshaft web 72a proximate to sensor assembly 46. Preferably, tone wheel 80 and sensor assembly 46 are configured to provide a sensor signal via input line 44 to controller 40 that corresponds to angular position of crankshaft 60. Furthermore, controller 40 may be configured to derive rotational speed information from this signal. Preferably, this speed and position information is used by controller 40 to control engine operation in a manner known to those skilled in the art.

Figure 2:
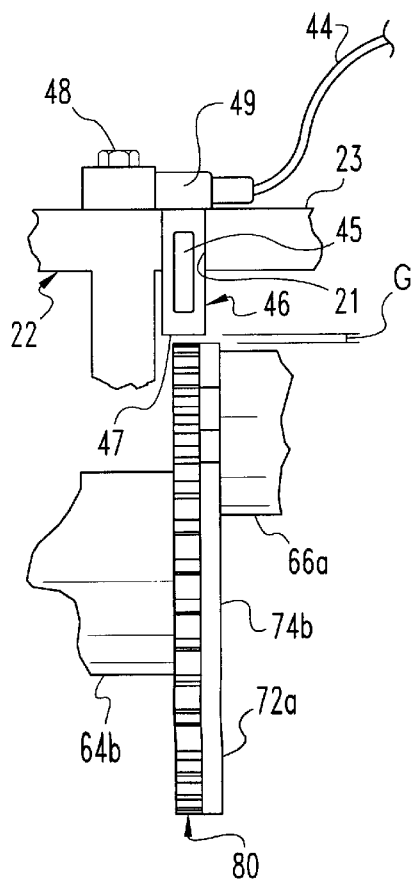
FIG. 2 is a partial bottom view of the tone wheel and crankshaft web assembly shown in FIG. 1.

Next, referring to FIG. 2, a partial bottom view of tone wheel 80 and crankshaft web 72a within engine 20 is shown. FIG. 2 depicts additional details concerning the relationship of tone wheel 80 and crankshaft web 72a to sensor assembly 46. Sensor assembly 46 extends through aperture 21 defined in wall 23 of block 22. Sensor assembly 46 has a detection end 47 positioned next to tone wheel 80 and separated therefrom by gap G. Sensor assembly 46 includes a hall effect device 45 positioned in detection end 47 to register changes in a magnetic field. Also shown is a mounting bolt 48 for mounting sensor assembly 46 to wall 23. Sensor assembly 46 has modular connector 49 configured for coupling to line 44. Tone wheel 80 rotates with crankshaft web 72a which is turn rotates as crankshaft 60 is turned. Preferably, gap G remains relatively constant during rotation of crankshaft 60.

Figure 3:
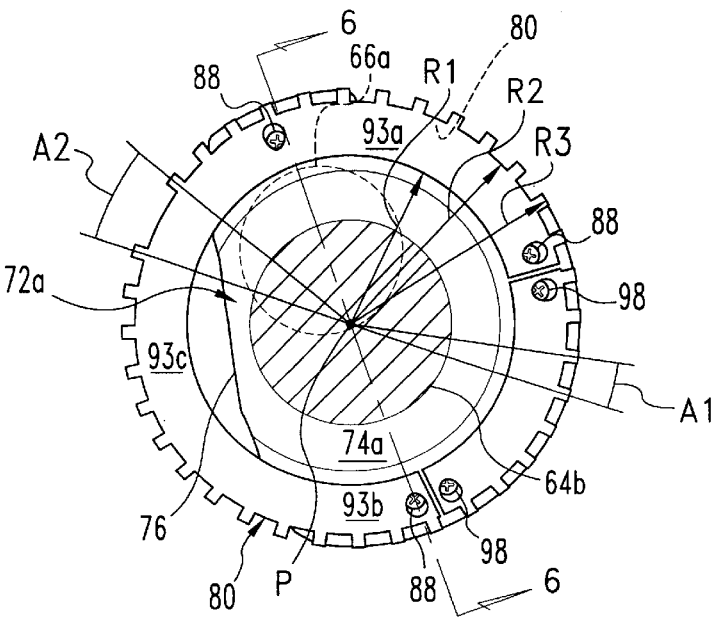
FIG. 3 is a front, partial cross-sectional view of the crankshaft showing the tone wheel and crankshaft web assembly of FIG. 1.
Figure 4:
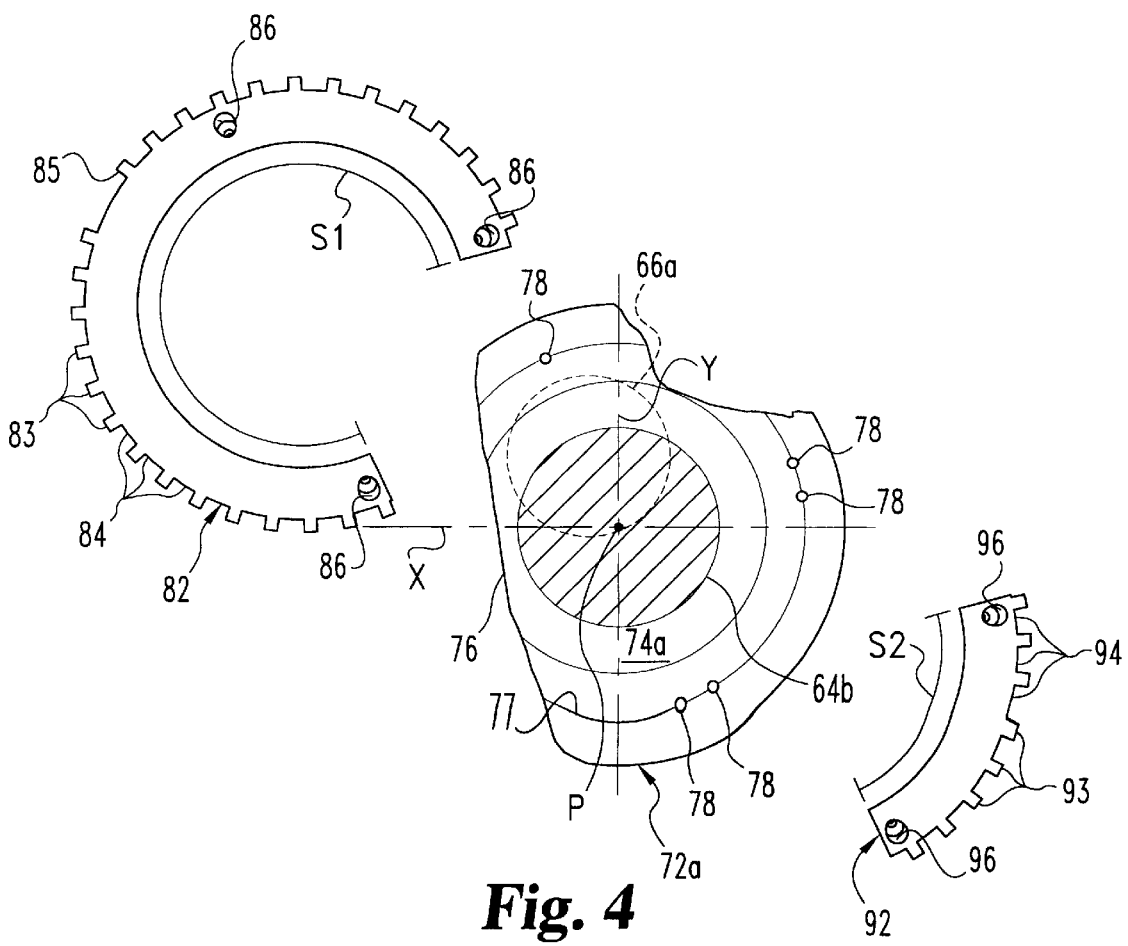
FIG. 4 is an exploded view of the assembly shown in FIG. 3 with the tone wheel fasteners removed for clarity.

Additionally referring to FIGS. 3–6, further details concerning the configuration of tone wheel 80 and crankshaft web 72a are provided. Tone wheel 80 is generally formed in a circular ring shape with an-inner radius R1 as depicted in FIG. 3. Tone wheel 80 includes a first arcuate ring segment 82 and a second arcuate ring segment 92. Each arcuate segment 82, 92 defines a corresponding number of peripheral teeth 83, 93 angularly spaced apart from one another to define generally uniform gaps 84, 94 therebetween. Each of teeth 83, 93 have about the same general size and shape. Similarly, each gap 84, 94 has about the same size and orientation. As a result, each tooth of wheel 80 is angularly spaced apart from an adjacent tooth by separation angle Al as represented in FIG. 3. Also, the minimum outer radius of wheel 80 corresponding to gaps 84, 94 of wheel 80 is indicated by radius R2, and a maximum outer radius of wheel 80 corresponding to teeth 83, 93 is indicated by radius R3. Segment 82 further defines an index gap 85 corresponding to index angle A2 as indicated in FIG. 3.

Figure 5:
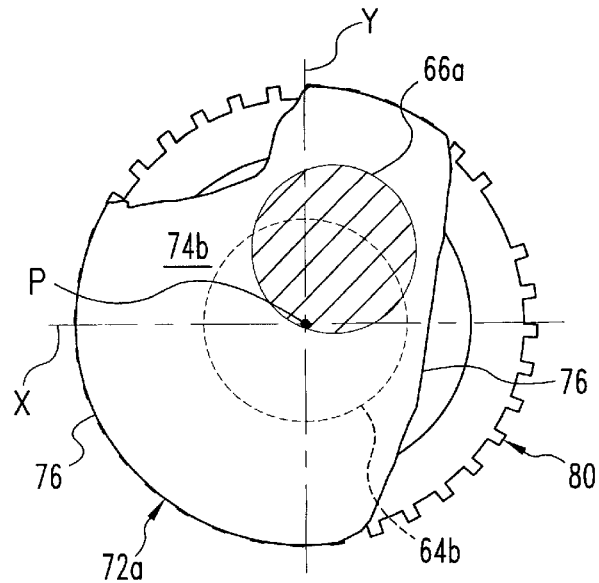
FIG. 5 is a rear, partial cross-sectional view of the crankshaft showing the tone wheel and crankshaft web assembly of FIG. 1.

Crankshaft web 72a includes face 74a defined by perimeter 76. Face 74a defines a recess 77 configured to receive wheel 80 and a number of threaded mounting bores 78 for mounting wheel 80 thereto. Because rotational axis R is perpendicular to the view plane of FIGS. 3–5, rotational axis R is represented by pivot point P in these figures. Perpendicular axes X, Y intersect at point P and radiate therefrom. Notably, face 74a is asymmetric with respect to pivot point P, axis R, axis X, and axis Y. Web 72a also has face 74b. Face 74b is located on a side of web 72a which is opposite the side having face 74a. Face 74b is illustrated in FIGS. 2 and 5, and is likewise asymmetric.

Segment 82 defines mounting holes 86. Similarly, segment 92 defines mounting holes 96. Mounting holes 86, 96 of wheel 80 are configured to align with corresponding threaded bores 78 of crankshaft web 72a. Once aligned, screws 88, 98 are threaded through holes 86, 96 to threadingly engage bores 78 and mount wheel 80 to crankshaft web 72a as illustrated in FIG. 3. Once mounted, wheel 80 has a generally circular ring shape which follows a generally circular path about crankshaft 60. Segment 82 includes end portion 93a mounted to crankshaft web 72a, end portion 93b mounted to crankshaft web 72a, and an intermediate arcuate portion 93c positioned between end portions 93a and 93b. Portion 93c extends past perimeter 76 of counter weight 72a. The multi-piece structure of wheel 80 permits segments 82, 92 to encircle a portion of crankshaft 60 without needing to disassemble crankshaft 60 or pass a reference member over an end of the crankshaft for installation or removal. By encircling the crankshaft, a high resolution index to crankshaft position may be more readily provided.

Figure 6:
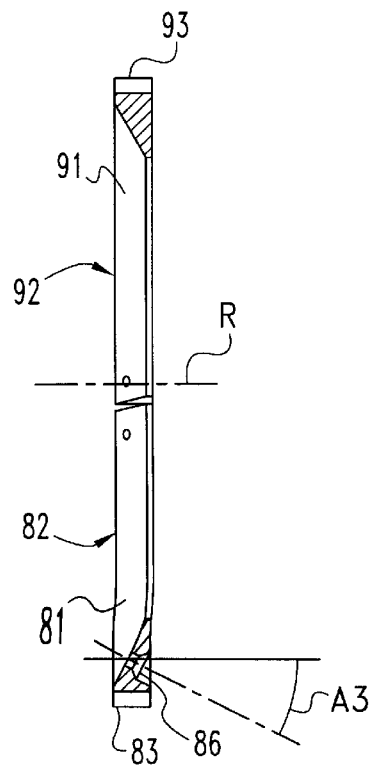
FIG. 6 is a cross sectional view of the tone wheel illustrated in FIGS. 1–5 which is separate from the crankshaft web to enhance clarity.

Referring to FIG. 6, beveled mounting surfaces 81, 91 corresponding to segments 82, 92 are illustrated. The bevel angle for these surfaces is preferably in a range of about 20°–25°, but may be varied as would occur to one skilled in the art. The angular orientation of a representative mounting hole 86 in segment 92 is illustrated as angle A3 relative to an axis that is parallel to rotational axis R. Preferably, angle A3 is about equal to the bevel angle.

For one preferred embodiment of wheel 80, separation angle A1 is no more than 250 and index angle A2 is at least 25% greater than angle A1 to provide an appropriate high precision resolution of crank angle and speed. For this embodiment, path S1 spans an angle of at least 180° about point P and path S2 spans an angle no more than 180° about point P, where these angles are equivalent to the angles swept by a radius rotating about point P from one end to the other of each segment 82, 92.

In the more preferred embodiment illustrated in FIGS. 1–6, angle A1 is about 10° and angle A2 is about 20° with about 27 generally equally sized teeth 83 defined by segment 82 and about 8 generally equally sized teeth 93 defined by segment 92. For this more preferred embodiment, S1 spans an angle of about 280° and S2 spans an angle of about 80° about point P.

In operation, sensor assembly 46 provides a magnetic field and hall effect device 45 generates an electrical signal in correspondence to alterations in that magnetic field. Teeth 83, 93 of wheel 80 are configured from a material designed to alter the magnetic field of hall effect device 45 as they rotate with crankshaft web 72a and crankshaft 60. As each tooth 83, 93 moves by detection end 47, a corresponding signal is generated by hall effect device 45 as a result of the alteration to the magnetic field. Preferably, the resulting signal is conditioned to provide a train of pulses with respect to time, where each pulse in the pattern represents a tooth as it passes by detection end 47 of sensor assembly 46.

The signal pattern provided by the generally uniform teeth 83, 93 and corresponding gaps.84, 94 is usually distinguishable from the signal pattern corresponding to index gap 85. As a result, index gap 85 provides a angular reference point for each revolution of crankshaft 60 which controller 40 may use to facilitate control of system 10. In one embodiment, index gap 85 may be positioned in a predetermined positional relationship to Top Dead Center (TDC) of a selected piston assembly 50 to control engine timing—accounting for the usual circumstance that a crankshaft makes two revolutions for each combustion/exhaust sequence of a given piston assembly in a four cycle engine. Furthermore, due to the uniformity of teeth 83, 93 and gaps 84, 94, controller 40 may readily register small changes in the speed of crankshaft 60 during each crankshaft rotation. In other embodiments, more or fewer teeth and different spatial patterns of teeth may be employed to accommodate the needs of the system employed.

Preferably, teeth 83, 84 of wheel 80 are manufactured from a ferrous material that readily registers an alteration of a magnetic field. Furthermore, as indicated in FIG. 1, it is preferred that tone wheel 80 and sensor assembly 46 be configured on a crankshaft web associated with the rearmost piston assembly 50 of engine 20. It has been discovered torsionals of engine 20 induce less sensor noise when wheel 80 is mounted to this location as compared to locating tone wheel 80 on one of the more forward webs 70b–70f or 72b–72f. Nonetheless, it is envisioned that wheel 80 may be located in different locations along crankshaft 60 in other embodiments.

Besides a tooth/gap arrangement, other types of indicators or markers are envisioned as would be suitable for the particular type of sensor selected. For example, U.S. Pat. No. 4,155,430 to Fernquist et al. uses differently polarized magnets embedded in a reference member to serve as indicators. Also, besides hall effect devices, other types of sensors, including but not limited to inductive and magnetoresistive varieties, may be used in other embodiments. Similarly, in still other embodiments it may not-be necessary to completely encircle crankshaft 60 with a ring structure in order to provide the desired precision. Also, it may not be necessary to include a reference gap or use a reference member with a ring shape. Furthermore, a single piece reference device, as opposed to the multi-piece tone wheel 80, may be mounted to a crankshaft web in alternative embodiments. In addition, it is envisioned that system 10 may be combined with other rotational sensor systems such as a cam shaft detection system to provide the desired engine control.

All publications, patents, and patent applications cited in this specification are herein incorporated by reference as if each individual publication, patent, or patent application were specifically and individually indicated to be incorporated by reference and set forth herein.

While the invention has been illustrated and described in detail in the drawings and foregoing description, the same is to be considered as illustrative and not restrictive in character, it being understood that only a preferred embodiment has been shown and described and that all changes and modifications that come within the spirit of the invention are desired to be protected.

What is claimed is:

1. A tone wheel configured for attachment to a crankshaft web of an internal combustion engine crankshaft to detect a rotational parameter of the crankshaft with a sensor responsive to variation of a magnetic field, comprising:

a first ring segment curved to span a first angle of at least 180 degrees and defining a first number of peripheral teeth each having a generally uniform size and being separated from each of other by a generally uniform separation angle;

a second ring segment curved to span a second angle of no more than 180 degrees and defining a second number of peripheral teeth each having the generally uniform size and separation angle of said first number of peripheral teeth; and wherein said first and second segments each define at least one mounting hole configured to receive a fastener for attachment to the crankshaft web, said first and second segments are configured to align with each other on a circular path that encircles a portion of the engine crankshaft when said first and second segments are attached to the crankshaft web to rotate therewith, one of said first and second segments defines an index gap corresponding to an index angle greater than the generally uniform separation angle, and said first number of teeth and said second number of teeth each include a material configured to cause a magnetic field variation detectable by the sensor when said first and second segments rotate with the crankshaft web.

2. The system of claim 1, wherein said first angle is at least 275 degrees and said second angle is no more than 85 degrees.

3. The system of claim 1, wherein the generally uniform separation angle is about 10 degrees.

4. The system of claim 1, wherein said first segment defines said index gap and said index angle is about 20 degrees.

5. The system of claim 1, wherein said first number of teeth is about 27 and said second number of teeth is about 8.

6. The system of claim 1, wherein said first angle is at least 275 degrees, said second angle is no more than 85 degrees, the generally uniform separation angle is about 10 degrees, said index angle is about 20 degrees, said first number of teeth is about 27, and said second number of teeth is about 8.

7. An internal combustion engine system, comprising:

(a) an engine crankshaft with a plurality of crankshaft webs, said crankshaft being configured to rotate during engine operation;

(b) a rotational reference device including at least two separable pieces mounted to one of said crankshaft webs to rotate therewith; and (c) a sensor positioned proximate to said crankshaft and responsive to movement of said reference device to provide a sensor signal corresponding to a rotational characteristic of said crankshaft.

8. The system of claim 7, wherein said at least two separable pieces each define at least one mounting hole configured to receive a corresponding fastener to mount to said one of said crankshaft webs.

9. The system of claim 7, wherein said device has a generally circular shape and encircles a portion of said crankshaft.

10. The system of claim 7, wherein said device defines a number of angularly spaced peripheral teeth configured to alter a magnetic field, and said sensor includes a hall effect component configured to detect alteration of the magnetic field.

11. The system of claim 7, further comprising a controller operatively coupled to the engine and responsive to said sensor signal to generate a control signal as a function of said sensor signal to operate the engine.

12. The system of claim 7, wherein said rotational characteristic corresponds to at least one of angular position or rotational speed of said crankshaft.

13. The system of claim 7, wherein said one of said crankshaft webs defines a face with a perimeter about a rotational axis of said crankshaft, said face is asymetric relative to said axis, and said reference device is mounted to said face and has a portion extending past the perimeter of said face.

14. The system of claim 7, wherein the pieces each correspond to one of a number of arcuate segments, the segments each being toothed and having at least one mounting hole for mounting to said one of said crankshaft webs without disassembling said crankshaft from an engine.

15. The system of claim 14, wherein a first one of said segments spans an angle of more than about 275 degrees and a second one of said segments spans an angle of less than about 85 degrees.

16. The system of claim 14, wherein said segments each include a beveled surface configured to contact said one of said crankshaft webs.

17. A control system, comprising:

(a) an engine with a crankshaft rotatably coupled to a number of cylinders, said crankshaft being configured to rotate about a rotational axis during engine operation and including a web with an asymmetric face having a noncircular perimeter about said rotational axis;

(b) a tone wheel mounted to said asymmetric face of said web, said tone wheel including a number of separate arcuate segments connected to said web by a number of fasteners, said segments being removable from said web while said crankshaft is mounted in said engine, said tone wheel defining a number of generally uniformly sized teeth spaced apart from each other along a generally circular path encircling said rotational axis and at least a portion of said tone wheel extending past said noncircular perimeter of said asymmetric face;

(c) a sensor located proximate to said crankshaft and configured to detect said first and second teeth to provide a sensor signal corresponding to a rotational characteristic of said crankshaft; and (d) a controller operatively coupled to said engine and responsive to said sensor to generate a control signal as a function of said sensor signal, said engine operating in accordance with said control signal;

wherein a gap distance between said sensor and each of said teeth remains substantially constant and a separation distance between said sensor and said noncircular perimeter substantially varies relative to said gap distance during a revolution of said crankshaft about said rotational axis.

18. The system of claim 17, wherein said arcuate segments include a first segment curved to span at least 180 degrees with a generally constant bend radius.

19. The system of claim 18, wherein said arcuate segments include a second segment curved to span less than 180 degrees with the generally constant bend radius of said first segment.

20. The system of claim 19, wherein said first and second segments each define at least one mounting hole configured for engagement by a corresponding one of said fasteners.

21. A method, comprising:
(a) providing an engine with a crankshaft mounted therein, the crankshaft being configured to rotate about a rotational axis during engine operation;
(b) accessing the crankshaft of the engine, the crankshaft including a web with an asymmetric face;
(c) mounting a generally circular tone wheel on the asymmetric face of the web, said mounting including attaching a first arcuate segment to the asymmetric face with a first fastener and a second arcuate segment to the asymmetric face with a second fastener to substantially encircle the crankshaft without disassembling the web from the crankshaft; and
(d) sensing rotation of the tone wheel after said mounting with a hall effect device.

22. The method of claim 21, further comprising retrofitting the tone wheel to a pre-existing design for the crankshaft by modifying the pre-existing design to define a first mounting hole configured for engagement by the first fastener and a second mounting hole configured for engagement by the second fastener.

23. The method of claim 22, wherein at least one of the first and second mounting holes has a longitudinal axis that forms an oblique angle relative to the rotational axis.

24. The method of claim 21, wherein the tone wheel has a beveled mounting surface for engaging the web.

25. The method of claim 24, wherein a bevel angle for the beveled mounting surface is in a range of about 20 to 25 degrees.

26. The method of claim 21, wherein the web is associated with a rearmost piston assembly of the engine to reduce sensor noise caused by engine torsionals.

* * * * *